(12) United States Patent
Roach et al.

(10) Patent No.: US 9,463,863 B1
(45) Date of Patent: Oct. 11, 2016

(54) SUPERPRESSURE BALLOON WITH BALLONET CUT FROM CONTIGUOUS GORES

(71) Applicant: Google Inc., Mountain View, CA (US)

(72) Inventors: Kevin Roach, San Jose, CA (US); Richard Wayne DeVaul, Mountain View, CA (US)

(73) Assignee: Google Inc., Mountain View, CA (US)

( * ) Notice: Subject to any disclaimer, the term of this patent is extended or adjusted under 35 U.S.C. 154(b) by 208 days.

(21) Appl. No.: 14/144,493

(22) Filed: Dec. 30, 2013

(51) Int. Cl.
*B64B 1/58* (2006.01)
*A63H 27/10* (2006.01)

(52) U.S. Cl.
CPC ................. *B64B 1/58* (2013.01); *A63H 27/10* (2013.01)

(58) Field of Classification Search
CPC ............. B64B 1/40; B64B 1/58; B64B 1/44; B64B 1/00; B64B 1/50; B64B 1/14; A63H 27/10; B64C 2201/022; B64C 2201/101
See application file for complete search history.

(56) References Cited

U.S. PATENT DOCUMENTS

| | | | |
|---|---|---|---|
| 2,931,597 A | 4/1960 | Moore, Jr. | |
| 3,432,122 A | 3/1969 | Flickinger et al. | |
| 3,558,083 A * | 1/1971 | Conley | B64B 1/60 244/33 |
| 4,174,082 A | 11/1979 | Eshoo | |
| 4,215,834 A | 8/1980 | Dunlap | |
| 4,262,864 A | 4/1981 | Eshoo | |
| 4,711,416 A | 12/1987 | Regipa | |
| 6,540,178 B1 | 4/2003 | Hillsdon | |
| 6,983,910 B2 | 1/2006 | Yajima et al. | |
| 7,567,779 B2 | 7/2009 | Seligsohn et al. | |
| 7,568,656 B2 | 8/2009 | Handley | |
| 8,814,084 B2 * | 8/2014 | Shenhar | A63H 27/10 244/128 |
| 8,998,128 B2 * | 4/2015 | Ratner | B64B 1/62 244/31 |
| 9,027,877 B1 * | 5/2015 | Brookes | B64B 1/58 137/223 |
| 9,033,274 B2 * | 5/2015 | DeVaul | B64B 1/62 244/31 |
| 9,067,666 B1 * | 6/2015 | Roach | B64B 1/42 |
| 2006/0065777 A1 * | 3/2006 | Walden | B64B 1/60 244/97 |
| 2007/0102570 A1 * | 5/2007 | Luffman | B64B 1/06 244/30 |
| 2008/0272233 A1 | 11/2008 | Marlin | |
| 2008/0299990 A1 * | 12/2008 | Knoblach | B64B 1/40 455/456.1 |

(Continued)

FOREIGN PATENT DOCUMENTS

| | | |
|---|---|---|
| JP | 3317546 | 8/2002 |
| WO | WO 2014089465 A1 * | 6/2014 ............... B64B 1/44 |

OTHER PUBLICATIONS

International Searching Authority, International Search Report and Written Opinion for PCT/US2013/020525 mailed Apr. 22, 2013, 16 pages.

*Primary Examiner* — Benjamin P Lee
(74) *Attorney, Agent, or Firm* — McDonnell Boehnen Hulbert & Berghoff LLP.

(57) ABSTRACT

A balloon including a balloon envelope formed with a plurality of adjacent envelope gores sealed together at respective edges of the envelope gores to form an envelope edge seam between each of the adjacent envelope gores, a ballonet positioned within the balloon envelope, the ballonet formed with a plurality of ballonet gores sealed together at their respective edges to form a ballonet edge seam between each of the adjacent ballonet gores, wherein each envelope gore is contiguous with a ballonet gore such that each envelope edge seam between adjacent envelope gores extends into a ballonet edge seam.

17 Claims, 16 Drawing Sheets

(56) References Cited

U.S. PATENT DOCUMENTS

| | | | |
|---|---|---|---|
| 2009/0189015 A1* | 7/2009 | Alavi | B64B 1/60 244/97 |
| 2009/0294576 A1 | 12/2009 | LaForge | |
| 2010/0012772 A1 | 1/2010 | Izutsu et al. | |
| 2014/0014769 A1* | 1/2014 | DeVaul | B64B 1/62 244/97 |
| 2014/0014770 A1* | 1/2014 | Teller | B64B 1/40 244/97 |
| 2014/0158823 A1* | 6/2014 | Smith | B64B 1/44 244/1 A |
| 2014/0360660 A1* | 12/2014 | Latham | B29D 22/02 156/269 |

* cited by examiner

SUPERPRESSURE BALLOON WITH BALLONET CUT FROM CONTIGUOUS GORES

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, a balloon is provided wherein the balloon envelope is formed together with the ballonet that is positioned within the balloon by using envelope gores that are contiguous with the ballonet gores. The balloon envelope is formed with a plurality of envelope gores that are sealed together at their respective edges to form an envelope edge seam between each of the adjacent envelope gores. Each envelope edge seam extends into a ballonet edge seam between adjacent ballonet gores as the ballonet is formed with a plurality of ballonet gores that are contiguous with the envelope gores. Each envelope gore is contiguous with a ballonet gore such that each envelope edge seam between adjacent envelope gores extends into a ballonet edge seam. A load ring is positioned over the ballonet and the balloon envelope and the ballonet is inverted into the balloon envelope.

In one aspect, an apparatus is provided including a balloon envelope formed with a plurality of adjacent envelope gores sealed together at respective edges of the envelope gores to form an envelope edge seam between each of the adjacent envelope gores, a ballonet positioned within the balloon envelope, the ballonet formed with a plurality of ballonet gores sealed together at their respective edges to form a ballonet edge seam between each of the adjacent ballonet gores, wherein each envelope gore is contiguous with a ballonet gore such that each envelope edge seam between adjacent envelope gores extends into a ballonet edge seam.

In another aspect, a balloon is provided a balloon envelope formed with a plurality of adjacent envelope gores sealed together at their respective edges to form an envelope edge seam between each of the adjacent envelope gores, and a ballonet is positioned within the balloon envelope, wherein the ballonet is comprised of a blown film tube comprised of a material that is lighter or thinner than the gore material used for the envelope gores.

In another aspect, a method of forming a balloon envelope and ballonet is provided including the steps of positioning a first contiguous gore comprising a first envelope gore contiguous with a first ballonet gore adjacent a second contiguous gore comprising a second envelope gore with a second ballonet gore, sealing the first contiguous gore to the second contiguous gore to form a first edge seam extending between the first and second envelope gores and between the first and second ballonet gores, positioning a third contiguous gore comprising a third envelope gore contiguous with a third ballonet gore adjacent the second contiguous gore, sealing the second contiguous gore to the third contiguous gore to form a second edge seam extending between the second and third envelope gores and between the second and third ballonet gores, positioning a final contiguous gore comprised of a final envelope gore and a final ballonet gore adjacent the first contiguous gore, sealing the final envelope gore to the first envelope gore to form a final edge seam extending between the first and final envelope gores and between the first and final ballonet gores, securing the respective gores to a load ring, and inverting the ballonet gores through the load ring and inside of the balloon envelope to form the ballonet.

These as well as other aspects, advantages, and alternatives, will become apparent to those of ordinary skill in the art by reading the following detailed description, with reference where appropriate to the accompanying drawings.

DETAILED DESCRIPTION

Figure 1:
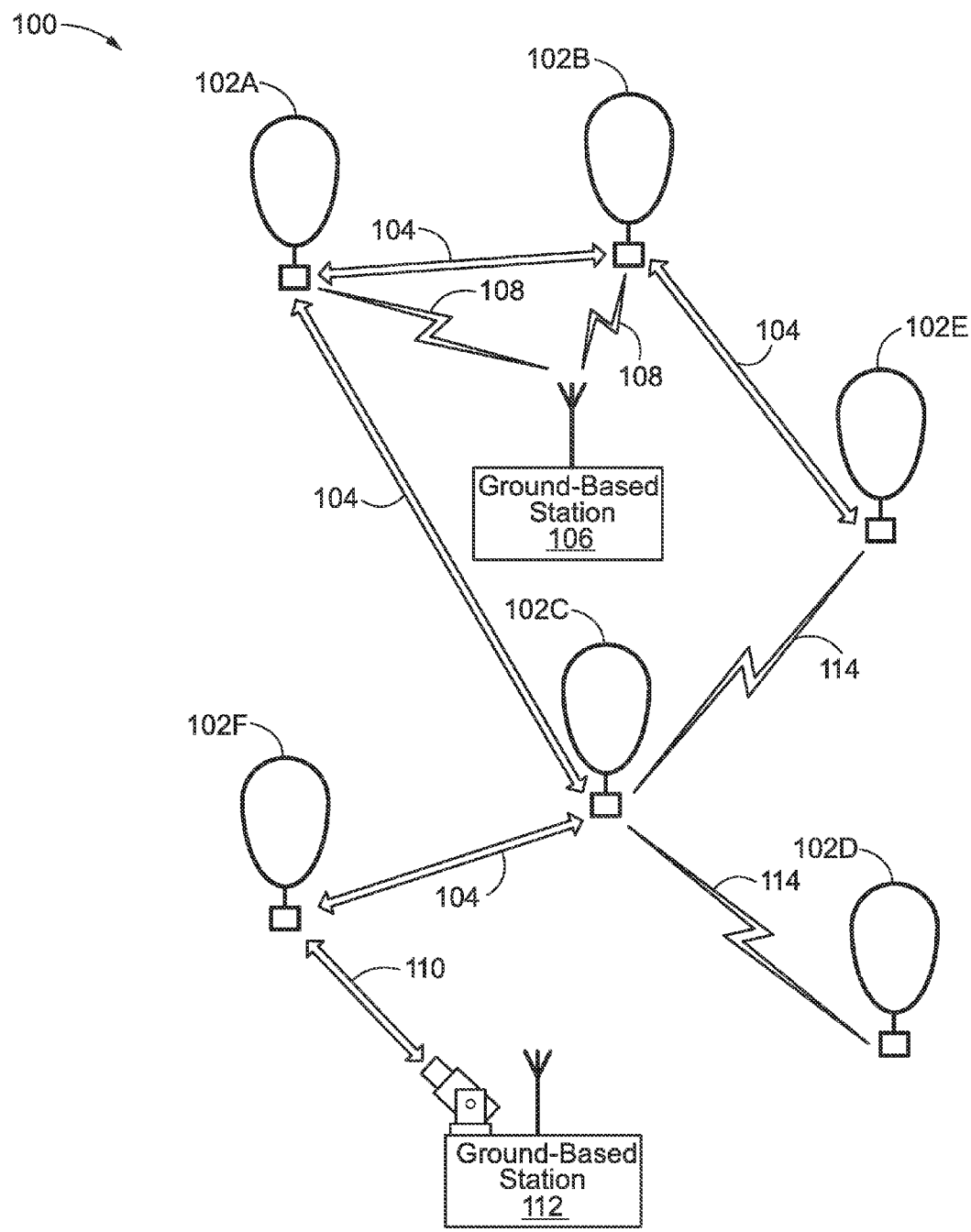
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using lasers and/or ultra-bright LEDs (which are also referred to as "high-power" or "high-output" LEDs). In addition, the balloons may communicate with ground-based station(s) using radio-frequency (RF) communications.

Exemplary embodiments may be implemented in association with a data network that includes a plurality of balloons. In an exemplary embodiment, such balloons may include a balloon having a ballonet positioned within the balloon envelope that is used for controlling the altitude of the balloon.

In an exemplary embodiment, the balloon envelope is filled with a pressurized lifting gas, such as helium or hydrogen, to provide buoyancy to the balloon and to maintain the balloon envelope aloft. A variable buoyancy system may include a ballonet that is located inside of the balloon envelope. The buoyancy of the balloon may be adjusted by changing the density and/or volume of the gas in the ballonet. To change the density of the gas in the ballonet, the balloon may be configured with systems and/or mechanisms for heating and/or cooling the gas in the ballonet. The amount of air in the ballonet could be changed by pumping air (e.g., with an air compressor) into and out of the ballonet. By adjusting the amount of air in the ballonet, the ballast force may be controlled. The ballast force may be used, in part, to counteract the buoyancy force and/or to provide altitude control and stability.

In the past, the inner ballonets used in superpressure balloons have been constructed separately from the balloon envelope. Often the inner ballonet is made of a lighter or different material than the balloon envelope for weight savings. The inner ballonet may have a wide variety of shapes and sizes, including a tetroon, cylinder, sphere, full diaphragm, etc. Positioning the ballonet inside of the balloon envelope requires additional manufacturing space and time. Additional handling of the film used for the balloon envelope and/or ballonet can lead to complications and damage to both the outer balloon envelope and the inner ballonet.

In some cases, a balloon envelope may be constructed by seaming together multiple envelope gores, which may be optimally shaped. For example, a pumpkin shaped balloon may be constructed with oversized lobing of the envelope gores. Adjacent envelope gores may be seamed together using a heat-sealing process. The process of seaming together adjacent envelope gores may be an automated process that allows balloon envelope manufacture to be converted to machine production, allowing for an increase in production volume and a reduction in costs. In addition, the repetitive steps of heat sealing the adjacent envelope gores can be more readily machine controlled for tolerances. Furthermore, in some cases it is desirable to apply longitudinal load tapes or tendons onto the envelope gores to provide additional strength to the balloon envelope. The application of the longitudinal load tapes or tendons is also a process that may be automated.

It would be desirable to manufacture the ballonet at the same time the balloon envelope is manufactured, and also to provide a method for manufacturing the ballonet and balloon envelope that is more automated and able to be converted to machine production, allowing for an increase in production volume and a reduction in costs.

Example embodiments are directed to a balloon, and methods of making a balloon, in which the balloon envelope and the ballonet are formed from contiguous gores. As noted above, the process of joining adjacent envelope gores in a heat sealing process may be an automated process. Therefore, it would be advantageous to form the ballonet with the balloon envelope using adjacent envelope gores that are contiguous with adjacent ballonet gores. In this manner, the ballonet and balloon envelope may be formed in a continuous motion, by sealing together the adjacent ballonet gores at the same time the adjacent envelope gores of the balloon envelope are sealed, because the ballonet gores and the envelope gores are contiguous. Furthermore, the ballonet gore and the envelope gore may be cut from the same roll of material as a single continuous gore. The ballonet can be made optimally from gores that are shaped in either a spherical configuration (to optimize for volume to weight) or a smaller pumpkin (in which case the ballonet could have a structural component). However, the ballonet gores could also form a cylinder or other multiple-gore shape as desired.

In the case where load tapes or tendons are applied to an envelope gore, the load tapes or tendons could be continued and also applied onto the contiguous ballonet gore. In this case, the load tape or tendon would extend continuously over the balloon envelope gore and onto the contiguous ballonet gore. The process of applying the load tapes or tendons could also be automated to increase production volume and reduce costs.

With this design and manufacturing method the ballonet and envelope may be constructed at the same time from contiguous gores that comprise the ballonet gores and the envelope gores, which may be formed from a single piece of gore material. With this design and manufacturing method, although the initial manufacturing table needs to accommodate the additional length of the ballonet gores, the overall space required by the operation is reduced, because the ballonets do not need to be constructed in a separate area.

Once the sealing of the envelope gores and ballonet gores are completed, a load ring is installed to the balloon envelope in a conventional fashion and the ballonet is inverted and pushed into the main envelope shell. In this manner, the ballonet is attached to the balloon envelope and positioned within the balloon envelope, as the ballonet gores are contiguous with the envelope gores.

2. Example Balloon Networks

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-toground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Example Balloon Configuration

Figure 2:
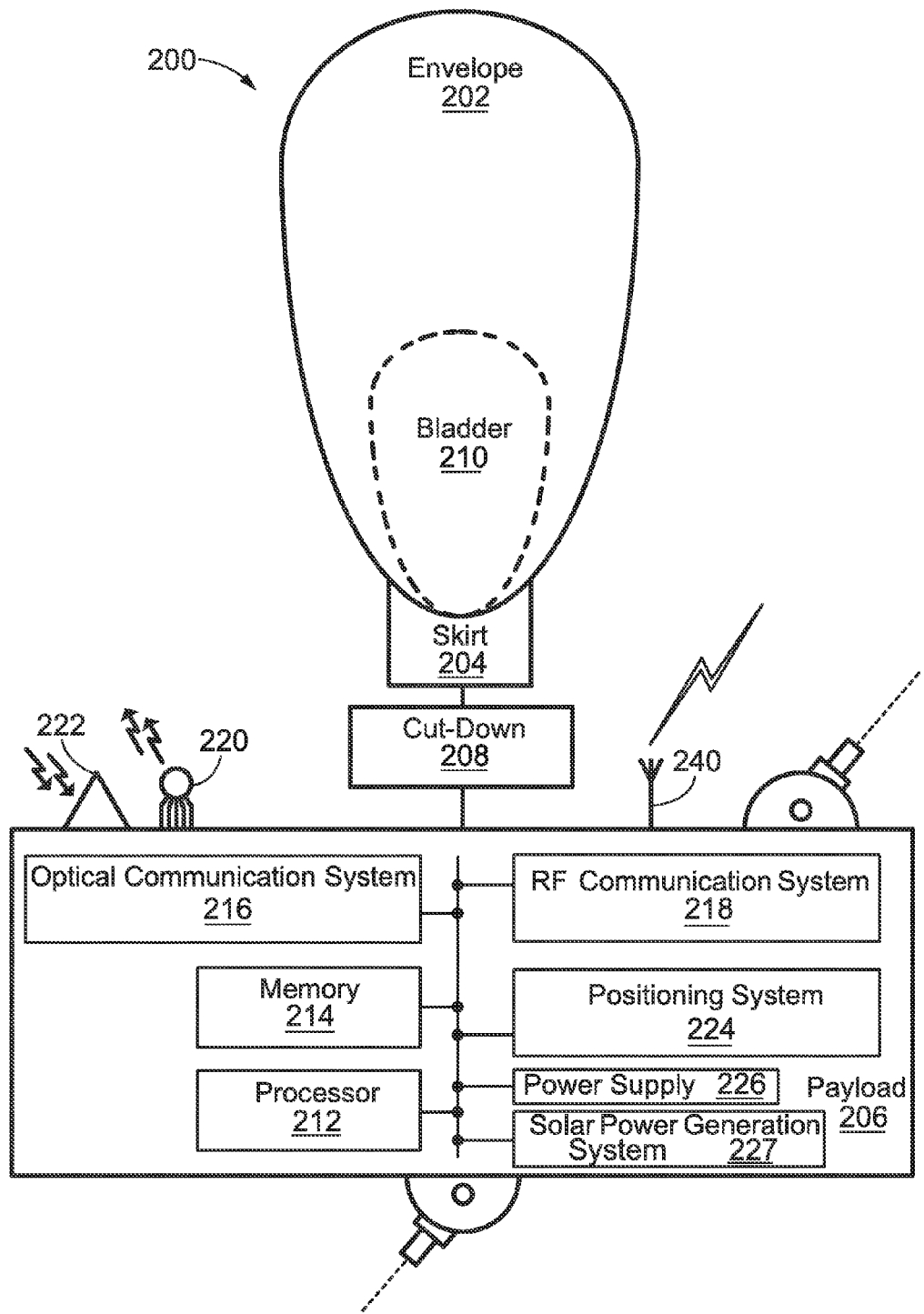
FIG. 2 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 2 shows a high-altitude balloon 200, according to an example embodiment. As shown, the balloon 200 includes an envelope 202, a skirt 204, a payload 206, and a cut-down system 208, which is attached between the balloon 202 and payload 204.

The envelope 202 and skirt 204 may take various forms, which may be currently well-known or yet to be developed. For instance, the envelope 202 and/or skirt 204 may be made of materials including metalized Mylar or BoPet. Additionally or alternatively, some or all of the envelope 202 and/or skirt 204 may be constructed from a highly-flexible latex material or a rubber material such as chloroprene. Other materials are also possible. Further, the shape and size of the envelope 202 and skirt 204 may vary depending upon the particular implementation. Additionally, the envelope 202 may be filled with various different types of gases, such as helium and/or hydrogen. Other types of gases are possible as well.

The payload 206 of balloon 200 may include a processor 212 and on-board data storage, such as memory 214. The memory 214 may take the form of or include a non-transitory computer-readable medium. The non-transitory computer-readable medium may have instructions stored thereon, which can be accessed and executed by the processor 212 in order to carry out the balloon functions described herein. Thus, processor 212, in conjunction with instructions stored in memory 214, and/or other components, may function as a controller of balloon 200.

The payload 206 of balloon 200 may also include various other types of equipment and systems to provide a number of different functions. For example, payload 206 may include an optical communication system 216, which may transmit optical signals via an ultra-bright LED system 220, and which may receive optical signals via an optical-communication receiver 222 (e.g., a photodiode receiver system). Further, payload 206 may include an RF communication system 218, which may transmit and/or receive RF communications via an antenna system 240.

The payload 206 may also include a power supply 226 to supply power to the various components of balloon 200. The power supply 226 could include a rechargeable battery. In other embodiments, the power supply 226 may additionally or alternatively represent other means known in the art for producing power. In addition, the balloon 200 may include a solar power generation system 227. The solar power generation system 227 may include solar panels and could be used to generate power that charges and/or is distributed by the power supply 226.

The payload 206 may additionally include a positioning system 224. The positioning system 224 could include, for example, a global positioning system (GPS), an inertial navigation system, and/or a star-tracking system. The positioning system 224 may additionally or alternatively include various motion sensors (e.g., accelerometers, magnetometers, gyroscopes, and/or compasses).

The positioning system 224 may additionally or alternatively include one or more video and/or still cameras, and/or various sensors for capturing environmental data.

Some or all of the components and systems within payload 206 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 200 includes an ultra-bright LED system 220 for free-space optical communication with other balloons. As such, optical communication system 216 may be configured to transmit a free-space optical signal by modulating the ultra-bright LED system 220. The optical communication system 216 may be implemented with mechanical systems and/or with hardware, firmware, and/or software. Generally, the manner in which an optical communication system is implemented may vary, depending upon the particular application. The optical communication system 216 and other associated components are described in further detail below.

In a further aspect, balloon 200 may be configured for altitude control. For instance, balloon 200 may include a variable buoyancy system, which is configured to change the altitude of the balloon 200 by adjusting the volume and/or density of the gas in the balloon 200. A variable buoyancy system may take various forms, and may generally be any system that can change the volume and/or density of gas in the envelope 202.

In an example embodiment, a variable buoyancy system may include a bladder 210 that is located inside of envelope 202. The bladder 210 could be an elastic chamber configured to hold liquid and/or gas. Alternatively, the bladder 210 need not be inside the envelope 202. For instance, the bladder 210 could be a rigid bladder that could be pressurized well beyond neutral pressure. The buoyancy of the balloon 200 may therefore be adjusted by changing the density and/or volume of the gas in bladder 210. To change the density in bladder 210, balloon 200 may be configured with systems and/or mechanisms for heating and/or cooling the gas in bladder 210. Further, to change the volume, balloon 200 may include pumps or other features for adding gas to and/or removing gas from bladder 210. Additionally or alternatively, to change the volume of bladder 210, balloon 200 may include release valves or other features that are controllable to allow gas to escape from bladder 210. Multiple bladders 210 could be implemented within the scope of this disclosure. For instance, multiple bladders could be used to improve balloon stability.

In an example embodiment, the envelope 202 could be filled with helium, hydrogen or other lighter-than-air material. The envelope 202 could thus have an associated upward buoyancy force. In such an embodiment, air in the bladder 210 could be considered a ballast tank that may have an associated downward ballast force. In another example embodiment, the amount of air in the bladder 210 could be changed by pumping air (e.g., with an air compressor) into and out of the bladder 210. By adjusting the amount of air in the bladder 210, the ballast force may be controlled. In some embodiments, the ballast force may be used, in part, to counteract the buoyancy force and/or to provide altitude stability.

In other embodiments, the envelope 202 could be substantially rigid and include an enclosed volume. Air could be evacuated from envelope 202 while the enclosed volume is substantially maintained. In other words, at least a partial vacuum could be created and maintained within the enclosed volume. Thus, the envelope 202 and the enclosed volume could become lighter-than-air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 202 could be a first color (e.g., black) and/or a first material from the rest of envelope 202, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 202 as well as the gas inside the envelope 202. In this way, the buoyancy force of the envelope 202 may increase. By rotating the balloon such that the second material is facing the sun, the temperature of gas inside the envelope 202 may decrease. Accordingly, the buoyancy force may decrease. In this manner, the buoyancy force of the balloon could be adjusted by changing the temperature/volume of gas inside the envelope 202 using solar energy. In such embodiments, it is possible that a bladder 210 may not be a necessary element of balloon 200. Thus, in various contemplated embodiments, altitude control of balloon 200 could be achieved, at least in part, by adjusting the rotation of the balloon with respect to the sun.

Further, a balloon 206 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 200 also includes a cut-down system 208. The cut-down system 208 may be activated to separate the payload 206 from the rest of balloon 200. The cut-down system 208 could include at least a connector, such as a balloon cord, connecting the payload 206 to the envelope 202 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 206 away from the envelope 202.

The cut-down functionality may be utilized anytime the payload needs to be accessed on the ground, such as when it is time to remove balloon 200 from a balloon network, when maintenance is due on systems within payload 206, and/or when power supply 226 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

3. Example of a Balloon Envelope and Ballonet Formed from Contiguous Gores

Figure 7A:
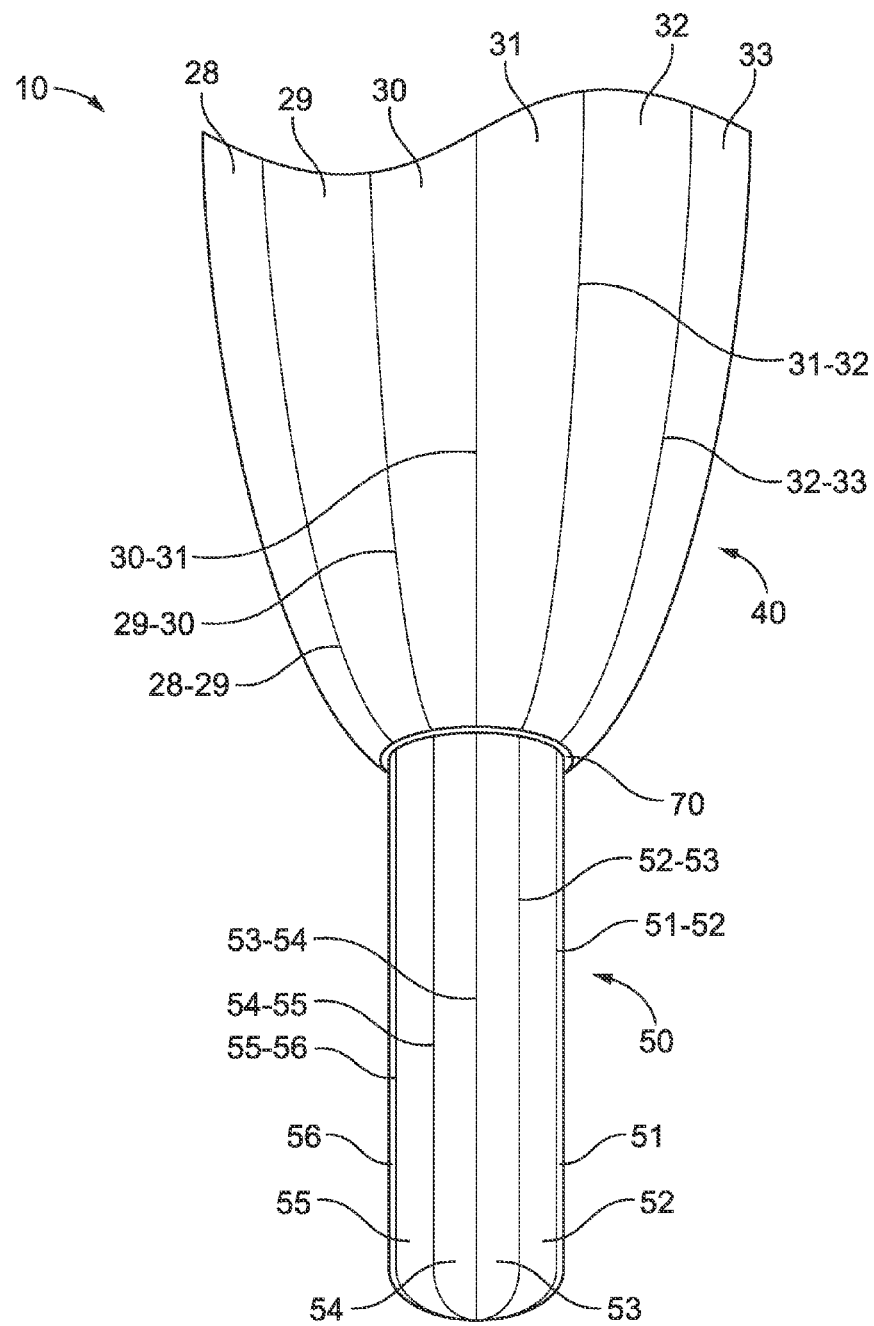
FIG. 7A shows a partial perspective view of the balloon 10 having balloon envelope 40 and ballonet 60 shown in FIG. 3B prior to inflation.
Figure 7B:
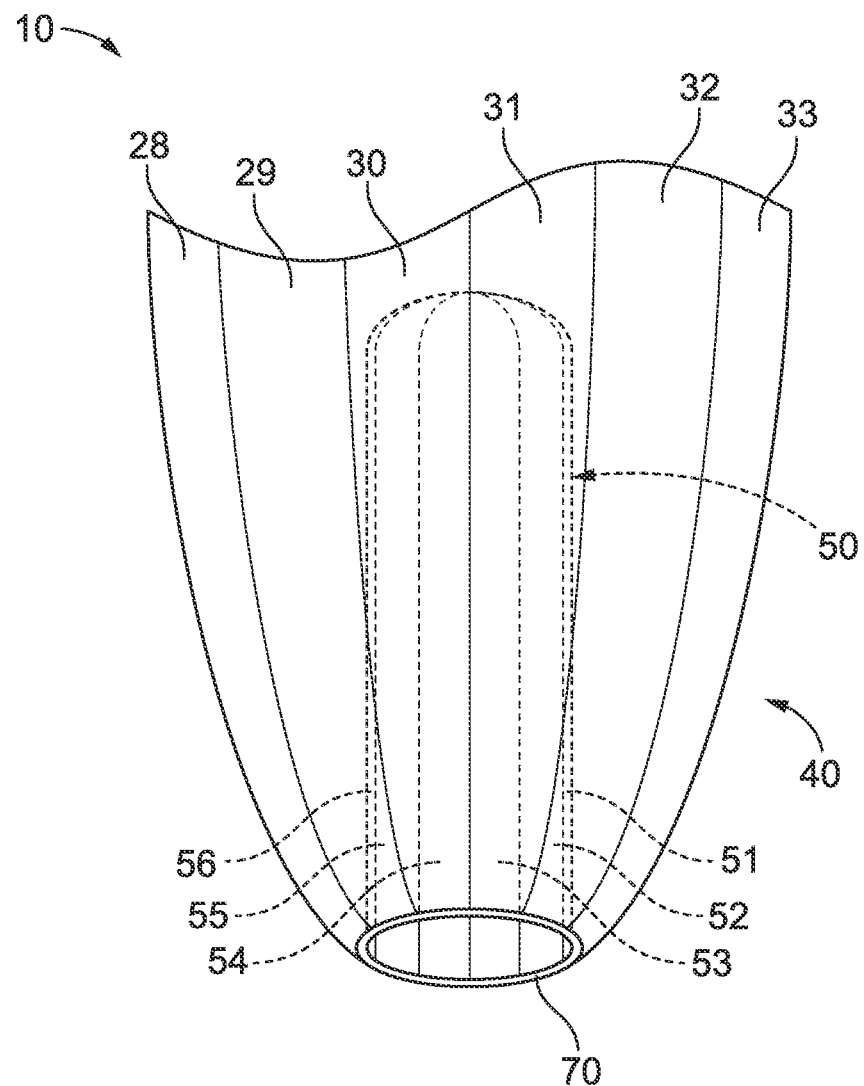
FIG. 7B shows the balloon 10a shown in FIG. 7A after the ballonet 60 has been inverted into balloon envelope 40.
Figure 8A:
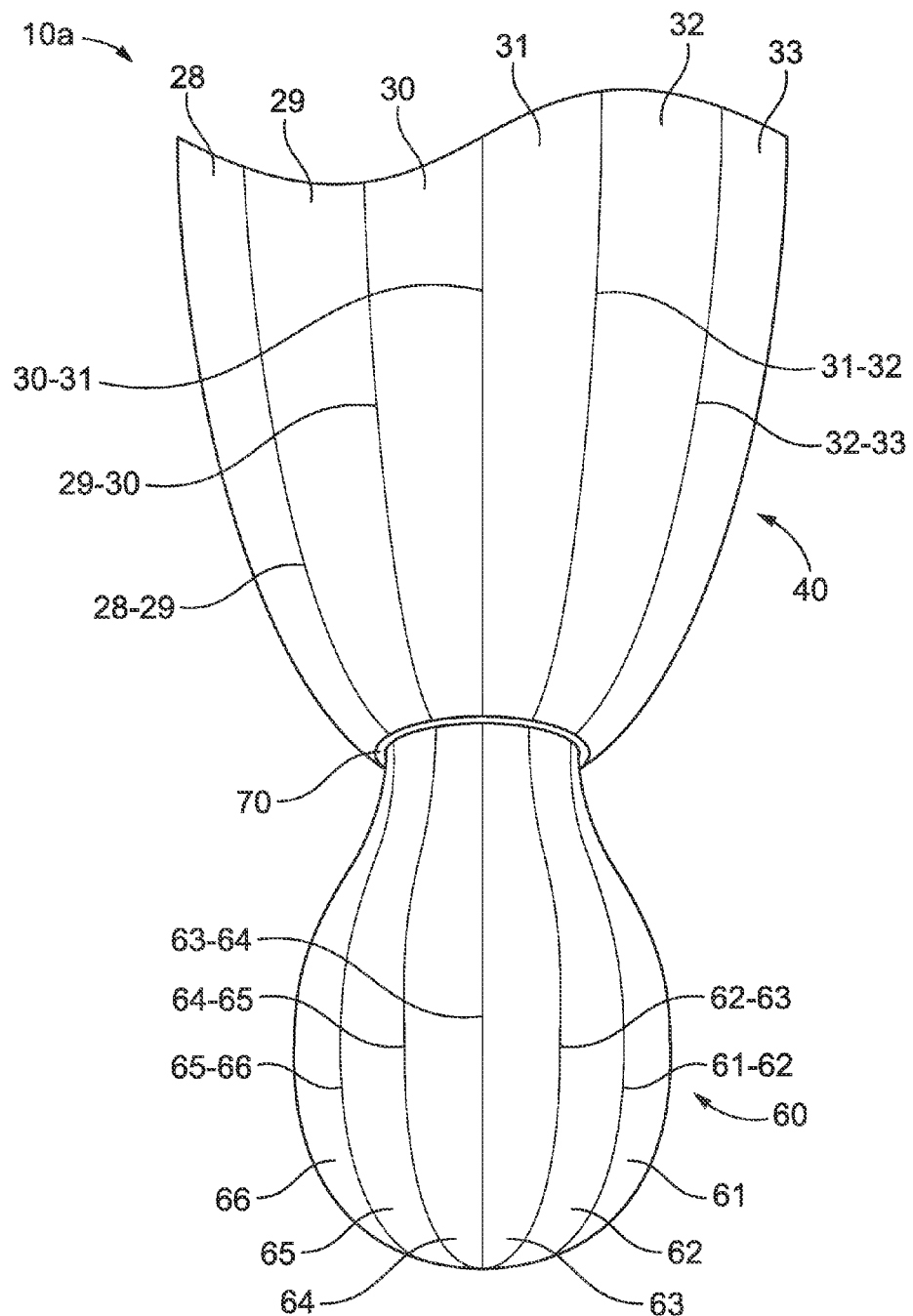
FIG. 8A shows a partial perspective view of the balloon 10 having balloon envelope 40 and ballonet 50 shown in FIG. 3A prior to inflation.
Figure 8B:
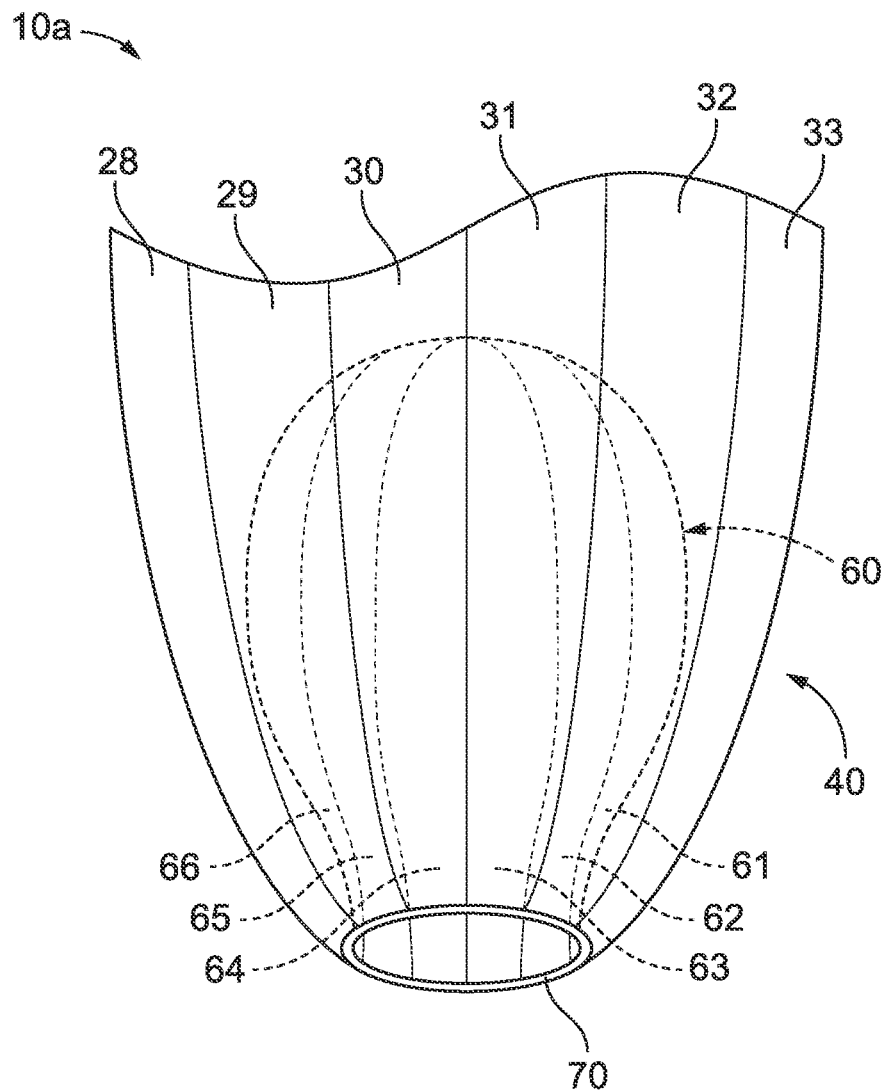
FIG. 8B shows the balloon 10a shown in FIG. 8A after the ballonet 50 has been inverted into balloon envelope 40.
Figure 9A:
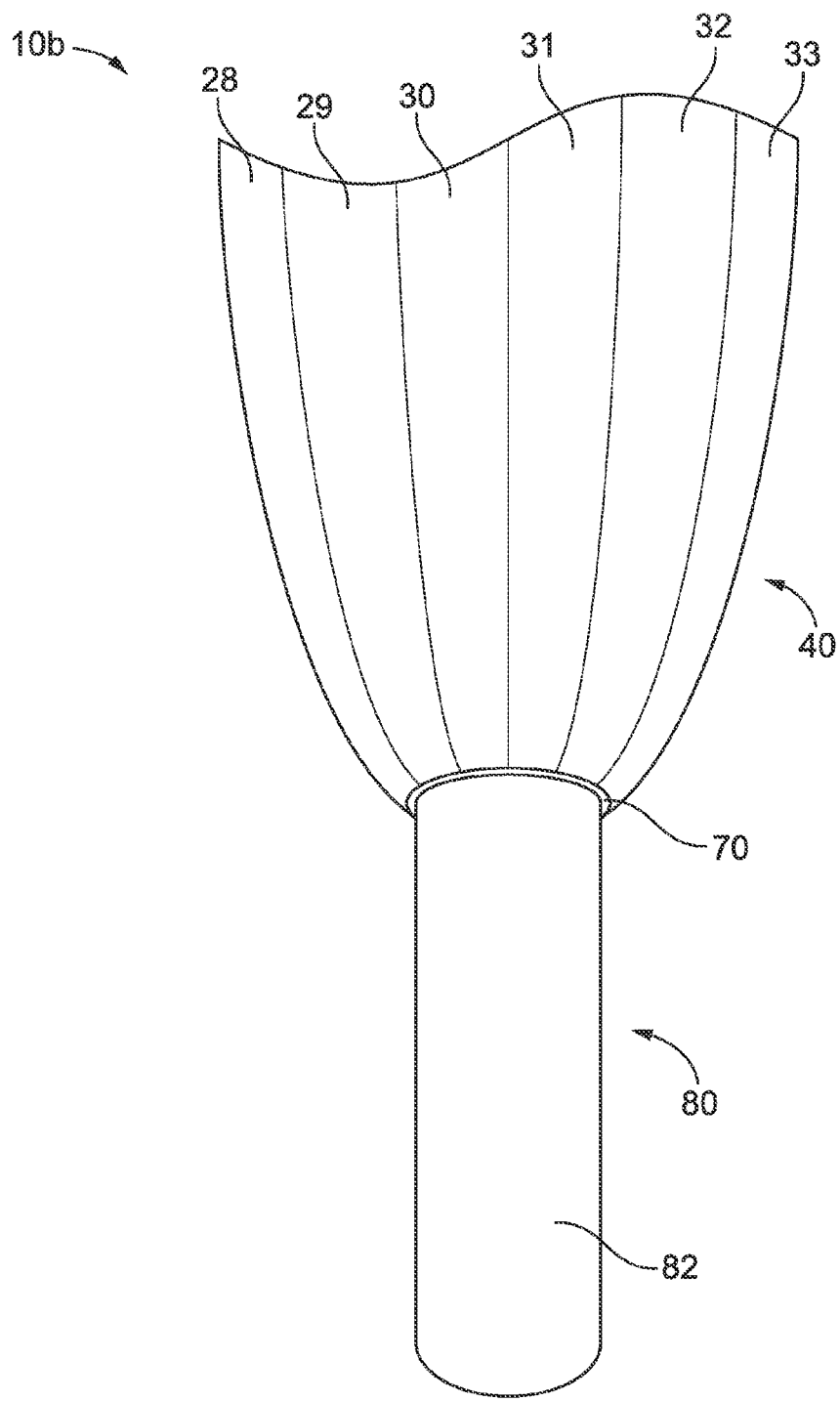
FIG. 9A shows a balloon 10b with balloon envelope 40 with ballonet 80.
Figure 9B:
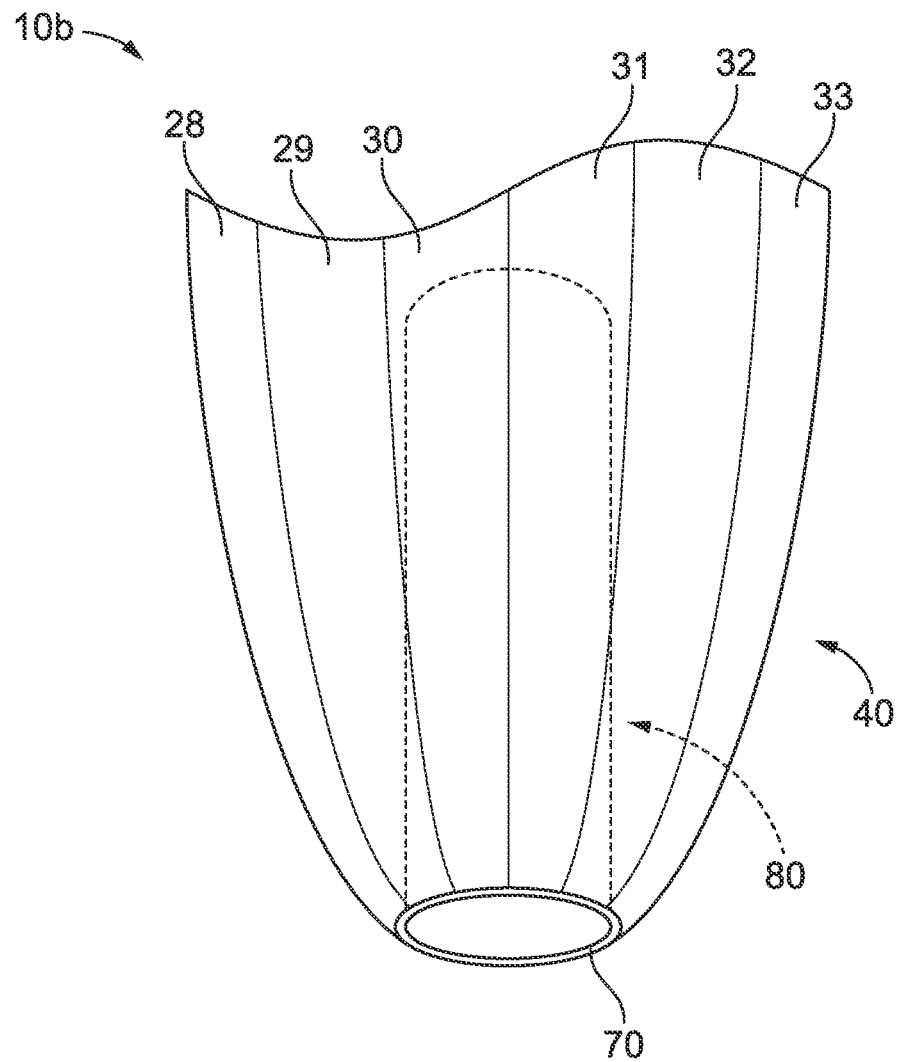
FIG. 9B shows the balloon 10b shown in FIG. 9A after the ballonet 80 has been inverted into balloon envelope 40.

As disclosed in FIGS. 3-9B, example embodiments are directed to balloons, according to an example embodiment. In FIGS. 3A, 4A, 5A, 6A, 7A, and 7B a balloon 10 includes a balloon envelope 40 and a ballonet 50 that is formed by continuous gores, according to one example embodiment. Further, FIGS. 3B, 4B, 5B, 6B, 8A, and 8B show a balloon 10a that includes a balloon envelope 40 and a ballonet 60 that are formed from contiguous gores, according to another example embodiment. FIGS. 9A and 9B show a balloon 10b that includes a balloon envelope 40 and a blown tube ballonet 80.

As noted above, the process of joining adjacent envelope gores in a heat-sealing process may be an automated process. Therefore, the present embodiments advantageously construct the ballonet 50 or 60 with the balloon envelope 40 using adjacent envelope gores that are contiguous with adjacent ballonet gores. In this manner, the ballonet and balloon envelope may be formed in a continuous motion, by sealing together the adjacent ballonet gores at the same time the adjacent envelope gores of the balloon envelope are sealed, because the ballonet gores and the envelope gores are contiguous. Furthermore, the ballonet gore and the envelope gore may be cut from the same roll of material as a single continuous gore. The ballonet can be made optimally from gores that are shaped in either a spherical configuration (to optimize for volume to weight) or a smaller pumpkin (in which case the ballonet could have a structural component). However, the ballonet gores could also form a cylinder or other multiple-gore shape as desired.

Figure 3A:
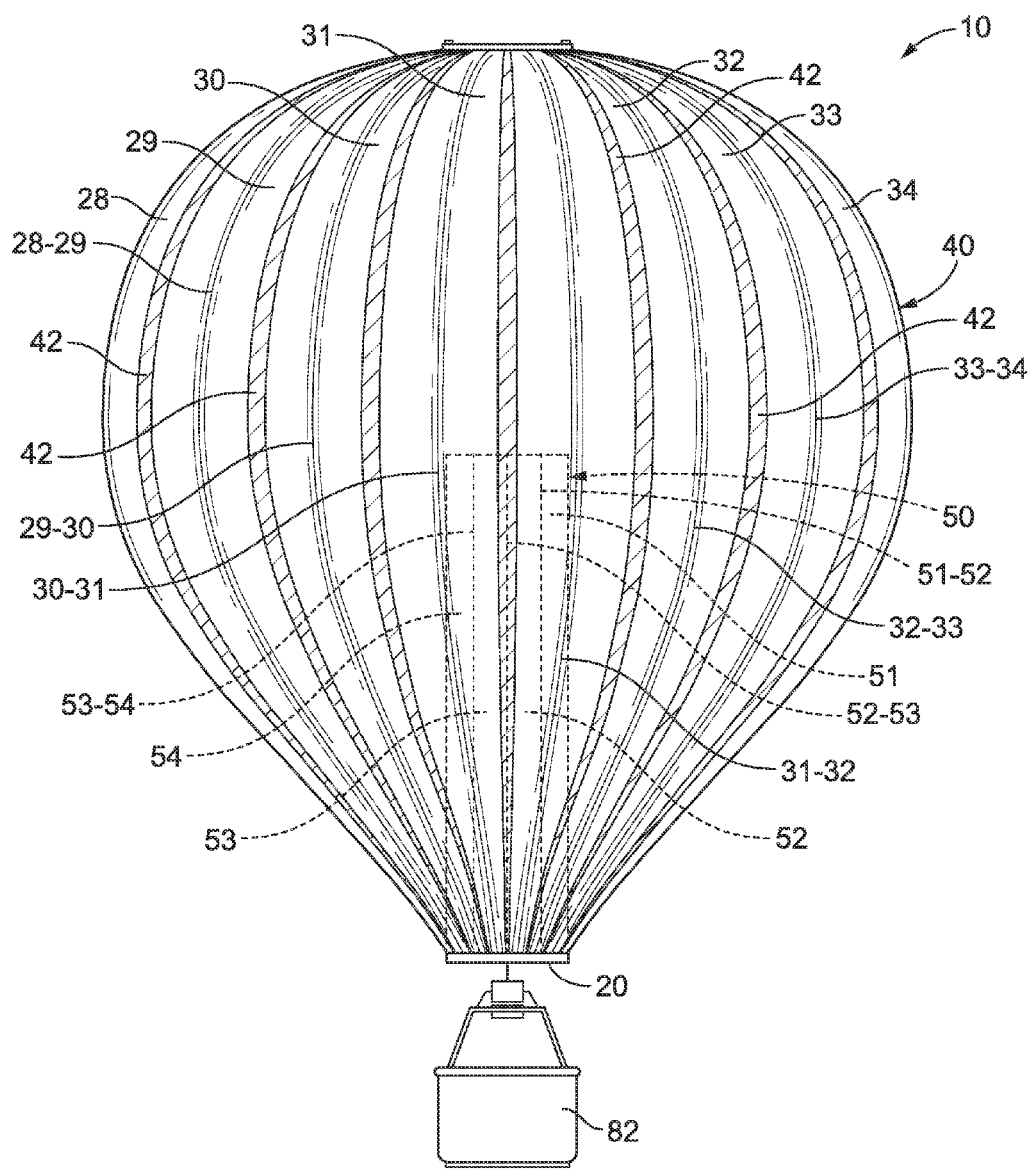
FIG. 3A shows a perspective view of a balloon 10 comprised of a balloon envelope 40 and internal ballonet 50, according to an example embodiment.

In FIG. 3A, a balloon 10 includes a balloon envelope 40 with an inner ballonet 50, and a payload 82 extending beneath the balloon envelope 40. Balloon envelope 40 has a "pumpkin" shape and is formed of envelope gores that are seamed together. In particular, balloon envelope 40 is constructed from envelope gore 30 that is attached to adjacent envelope 31 at edge seam 30-31 and to adjacent envelope gore 29 at edge seam 29-30. Envelope gore 28 is shown attached to envelope gore 29 at edge seam 28-29. Envelope gore 32 is shown attached to adjacent envelope gore 31 at edge seam 31-32 and to adjacent envelope gore 33 at edge seam 32-33. Envelope gore 34 is shown attached to envelope gore 33 at edge seam 33-34. The edge seams between adjacent envelope gores may be formed by heat sealing, although other means of attachment that provide for an air tight seal between adjacent envelope gores may also be used. In a preferred embodiment, the envelope gores are comprised of polyethylene having a thickness of 1.5 to 2 mils. Each of the respective envelope gores extend to balloon bottom 20.

The individual envelope gores 28-34 may be shaped so that the length of the edge seam connecting adjacent envelope gores is greater than the length of a center-line of the envelope gores positioned beneath load tapes 42. Thus, the envelope gores may be shaped to better optimize the strain rate experienced by the balloon envelope. The pressurized lifting gas within the balloon envelope causes a force or load to be applied to the balloon envelope.

In some embodiments longitudinal tendons or load tapes 42 may be used to provide strength to the balloon envelope and to help withstand the load created by the pressurized gas within the balloon envelope. The placing of the load tapes 42 on the envelope gores of the balloon envelope 40 is process that may be automated and is a step that may be performed during the sealing together of the adjacent envelope gores.

Inner ballonet 50 in this example is constructed with a tubular shape. The inner ballonet is constructed from ballonet gores that are contiguous with the envelope gores used to form the balloon envelope 40. In this embodiment, the tubular ballonet is constructed from ballonet gores 51-54, shown having respective edge seams 51-52, 52-53, and 53-54.

Figure 3B:
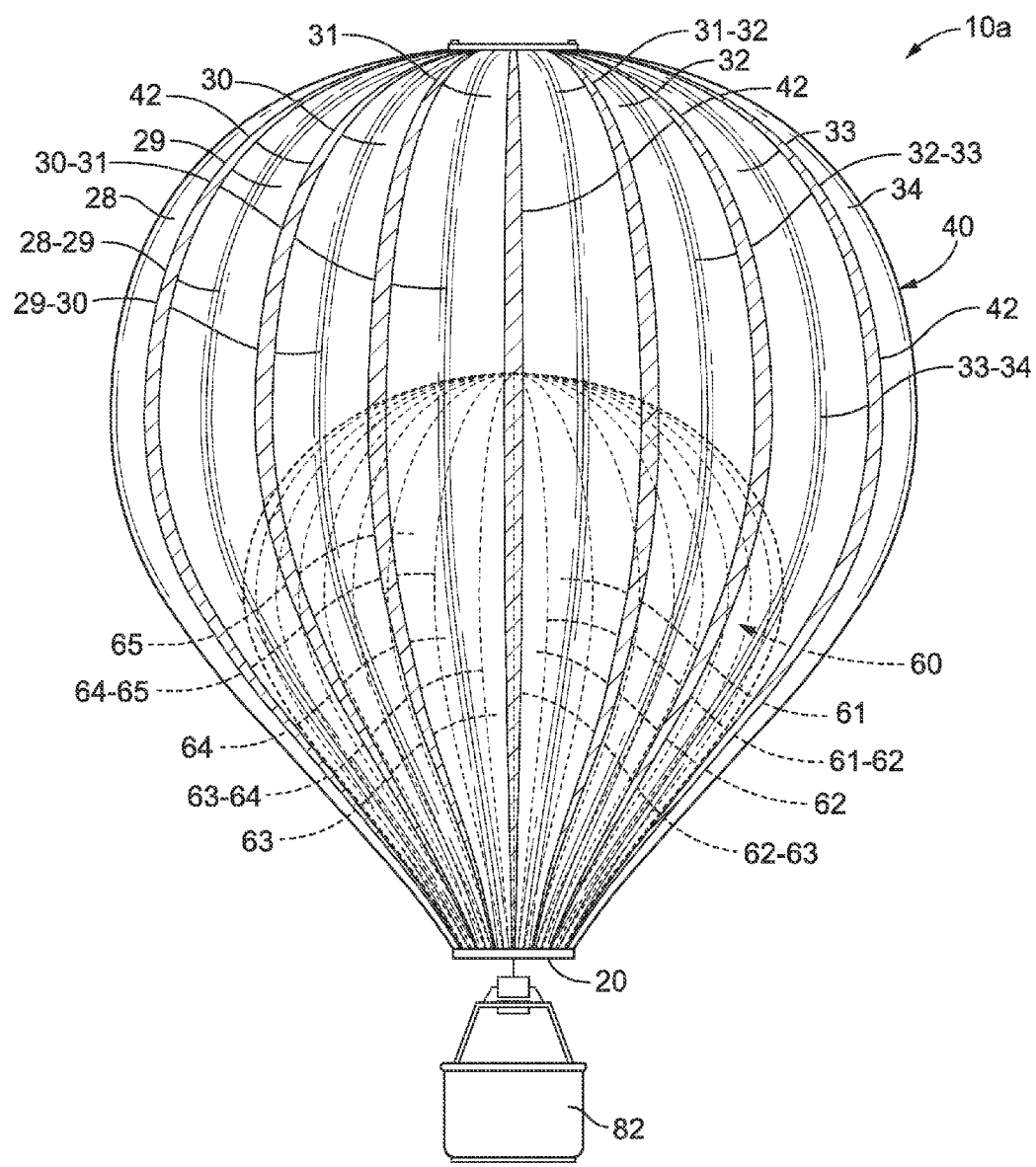
FIG. 3B shows a perspective view of a balloon 10a comprised of a balloon envelope 40 and internal ballonet 60, according to an example embodiment.

In FIG. 3B, a balloon 10*a* is provided having a balloon envelope 40 and inner ballonet 60, with a payload 82 extending beneath the balloon envelope 40. Balloon envelope 40 has a "pumpkin" shape and is formed of envelope gores that are seamed together. In particular, balloon envelope 40 is constructed from envelope gore 30 that is attached to adjacent envelope 31 at edge seam 30-31 and to adjacent envelope gore 29 at edge seam 29-30. Envelope gore 28 is shown attached to envelope gore 29 at edge seam 28-29. Envelope gore 32 is shown attached to adjacent envelope gore 31 at edge seam 31-32 and to adjacent envelope gore 33 at edge seam 32-33. Envelope gore 34 is shown attached to envelope gore 33 at edge seam 33-34. The edge seams between adjacent envelope gores may be formed by heat sealing, although other means of attachment that provide for an air tight seal between adjacent envelope gores may also be used. In a preferred embodiment, the envelope gores are comprised of polyethylene having a thickness of 1.5 to 2 mils. Each of the respective envelope gores extend to balloon bottom 20.

As in FIG. 3A, in FIG. 3B the individual envelope gores 28-34 may be shaped so that the length of the edge seam connecting adjacent envelope gores is greater than the length of a center-line of the envelope gores. Thus, the envelope gores may be shaped to better optimize the strain rate experienced by the balloon envelope. In addition, longitudinal tendons or load tapes 42 may be used to provide strength to the balloon envelope 40 and to help withstand the load created by the pressurized gas within the balloon envelope. The placing of the load tapes 42 on the envelope gores of the balloon envelope 40 is process that may be automated and is a step that may be performed during the sealing together of the adjacent envelope gores.

Inner ballonet 60 in this example is constructed with a pumpkin shape. The inner ballonet 60 is constructed from ballonet gores that are contiguous with the envelope gores used to form the balloon envelope 40. In this embodiment, the pumpkin-shaped ballonet is constructed from a series of ballonet gores, such as ballonet gores 60-65, shown having respective edge seams 61-62, 62-63, 63-64, and 64-65.

In the case where load tapes or tendons 42 are applied to an envelope gore, the load tapes or tendons could be continued and also applied onto the contiguous ballonet gore. In this case, the load tape or tendon would extend continuously over the balloon envelope gore and onto the contiguous ballonet gore. The process of applying the load tapes or tendons could also be automated to increase production volume and reduce costs.

Figure 4A:
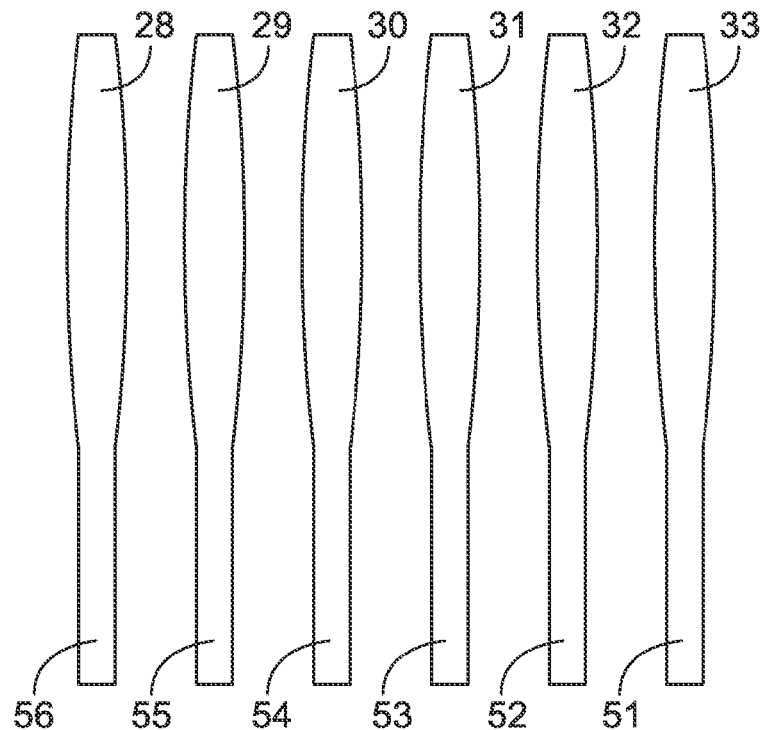
FIG. 4A shows a top view of the balloon envelope gores contiguous with ballonet gores used to construct the balloon envelope and ballonet shown in FIG. 3A.

FIG. 4A illustrates the contiguous envelope gores and ballonet gores that are used to construct the tubular ballonet 50 shown in FIG. 3A. In particular, envelope gore 28 is contiguous with ballonet gore 56, envelope gore 29 is contiguous with ballonet gore 55, envelope gore 30 is contiguous with ballonet gore 54, envelope gore 31 is contiguous with ballonet gore 53, envelope gore 32 is contiguous with ballonet gore 52, and envelope gore 33 is contiguous with ballonet gore 51. Because the envelope gores are contiguous with the ballonet gores they may be cut from a single roll of envelope material. Furthermore, the edge seams between adjacent envelope gores extends into an edge seam between adjacent ballonet gores.

Figure 4B:
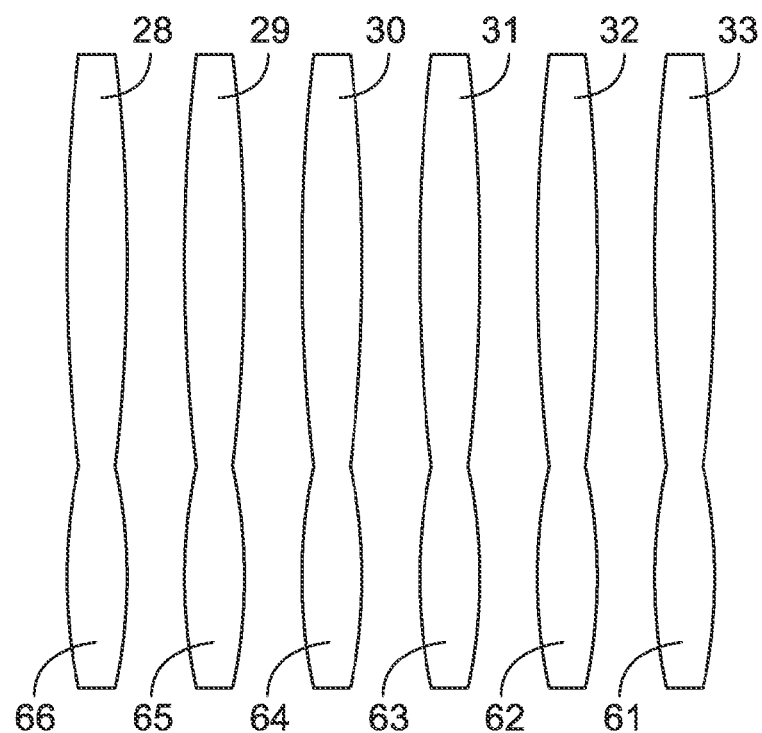
FIG. 4B shows a top view of the balloon envelope gores contiguous with ballonet gores used to construct the balloon envelope and ballonet shown in FIG. 3B.

FIG. 4B illustrates the contiguous envelope gores and ballonet gores that are used to construct the pumpkin-shaped ballonet 60 shown in FIG. 3B. In particular, envelope gore 28 is contiguous with ballonet gore 66, envelope gore 29 is contiguous with ballonet gore 65, envelope gore 30 is contiguous with ballonet gore 64, envelope gore 31 is contiguous with ballonet gore 63, envelope gore 32 is contiguous with ballonet gore 62, and envelope gore 33 is contiguous with ballonet gore 61. These envelope gores are also contiguous with the ballonet gores and therefore may be cut from a single roll of envelope material. Furthermore, the edge seams between adjacent envelope gores extends into an edge seam between adjacent ballonet gores.

Figure 5A:
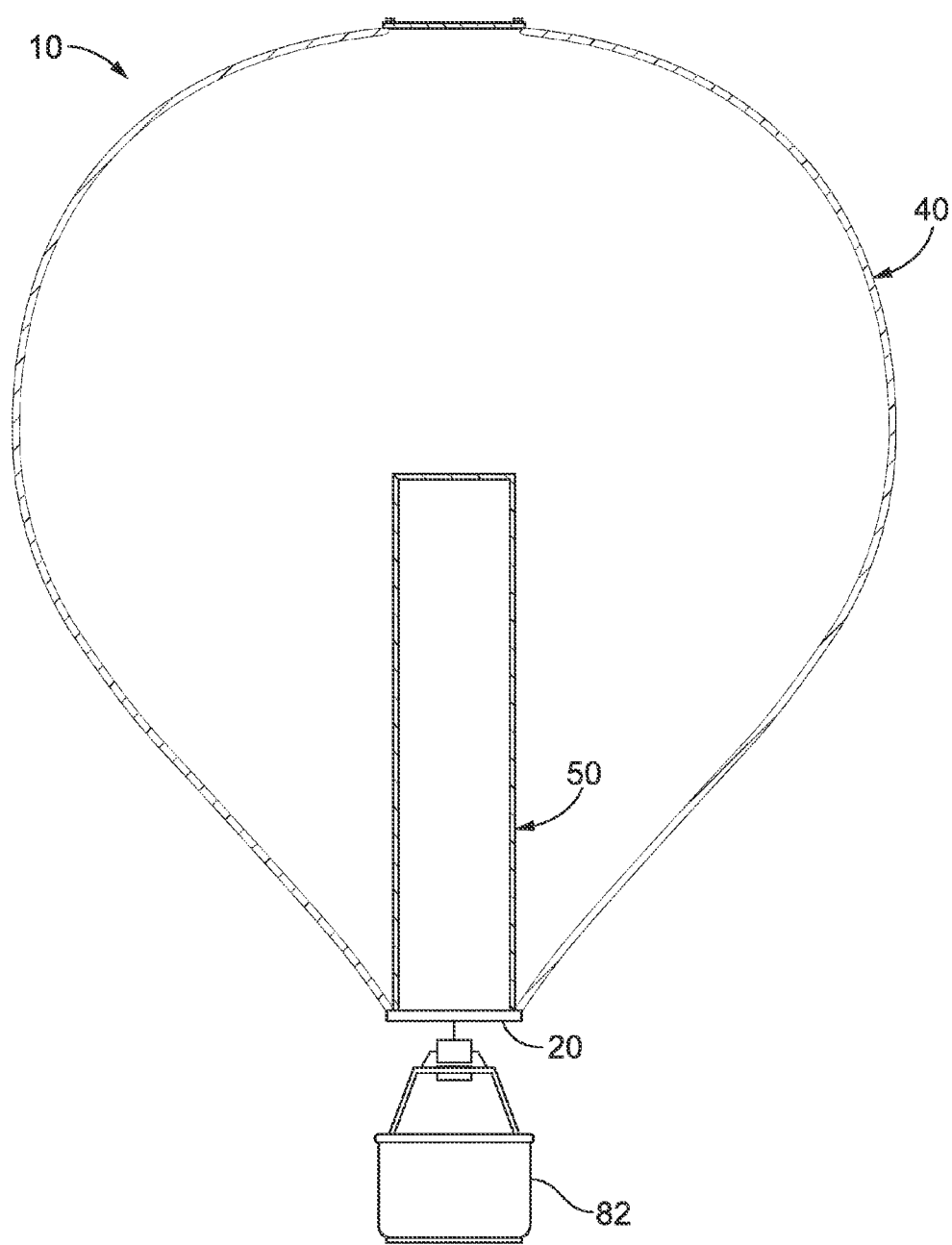
FIG. 5A shows a cross-sectional view of the balloon 10 with balloon envelope 40 and ballonet 50 shown in FIG. 3A.

FIG. 5A shows a cross-sectional view of the balloon 10 with balloon envelope 40 and tubular ballonet 50 shown in FIGS. 3A and 4A. The envelope gores of balloon envelope 40 extend above balloon bottom 20 and are contiguous with the ballonet gores of ballonet 50. Payload 82 is shown extending beneath balloon envelope 40.

Figure 5B:
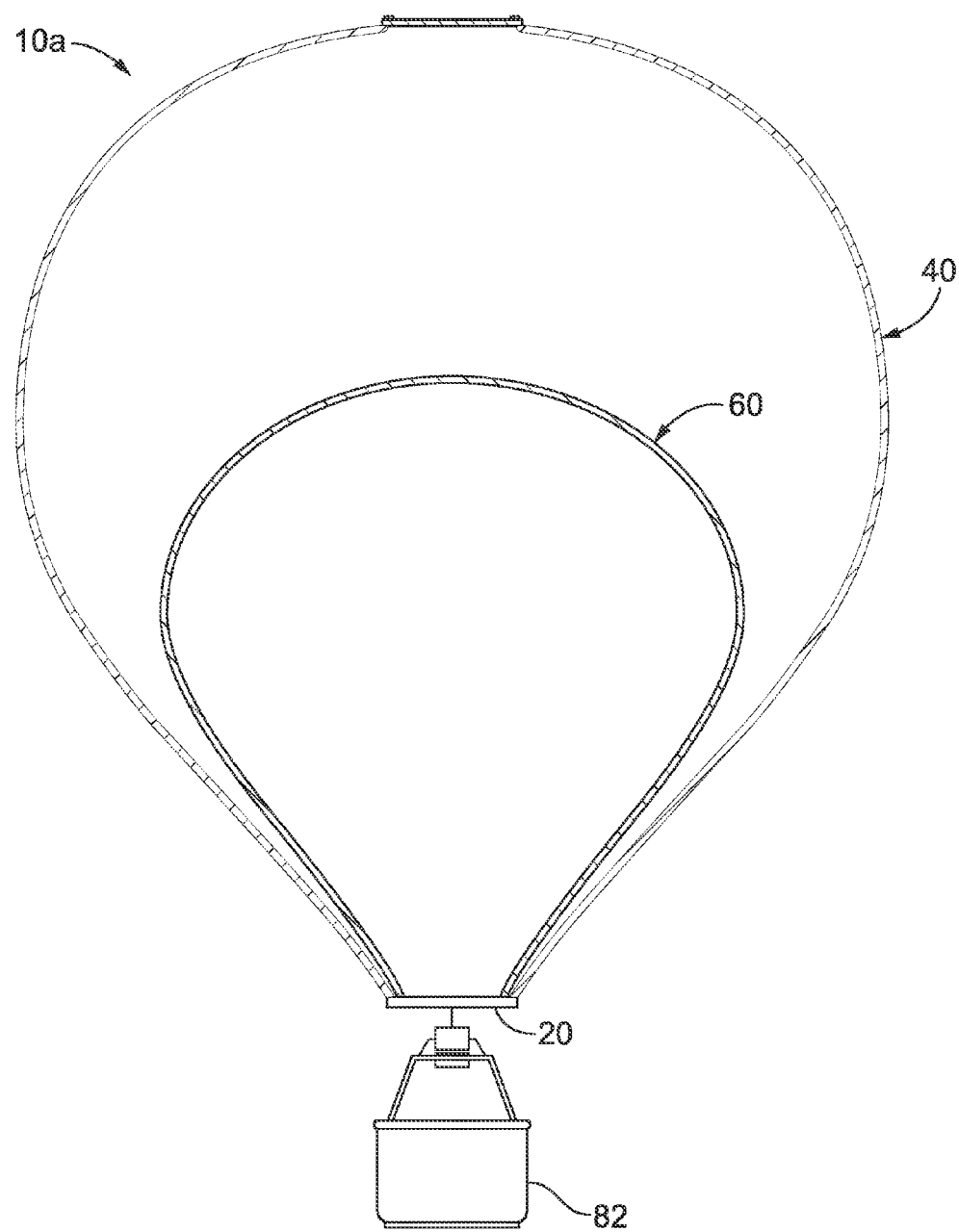
FIG. 5B shows a cross-sectional view of the balloon 10a with balloon envelope 40 and ballonet 60 shown in FIG. 3B.

FIG. 5B shows a cross-sectional view of the balloon 10*a* with balloon envelope 40 and pumpkin-shaped ballonet 60 shown in FIGS. 3B and 4B. The envelope gores of balloon envelope 40 extend above balloon bottom 20 and are contiguous with the ballonet gores of ballonet 60. Payload 82 is shown extending beneath balloon envelope 40.

Figure 6A:
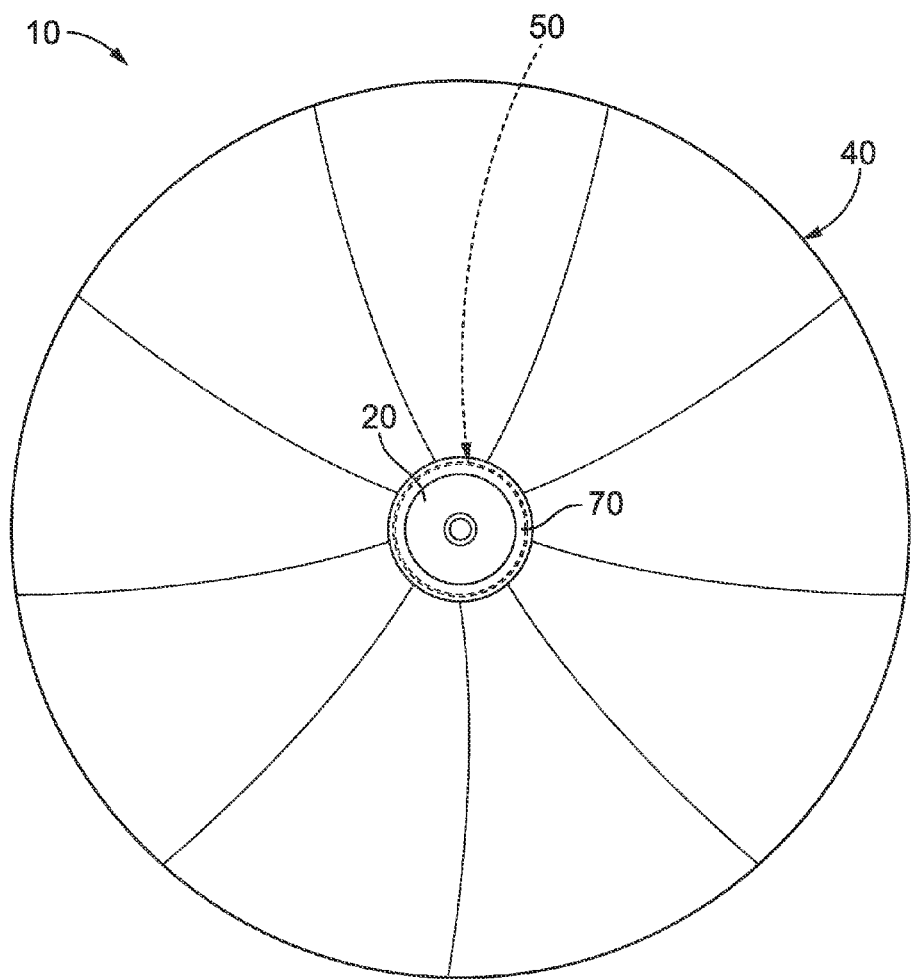
FIG. 6A shows a bottom view of the balloon 10 shown in FIG. 3A.

FIG. 6A shows a bottom view of the balloon 10 with balloon envelope 40 and tubular ballonet 50 shown in FIGS. 3A, 4A, and 5A. The envelope gores of balloon envelope 40 extend above balloon bottom 20 and are contiguous with the ballonet gores of ballonet 50 that extends above load ring 70.

Figure 6B:
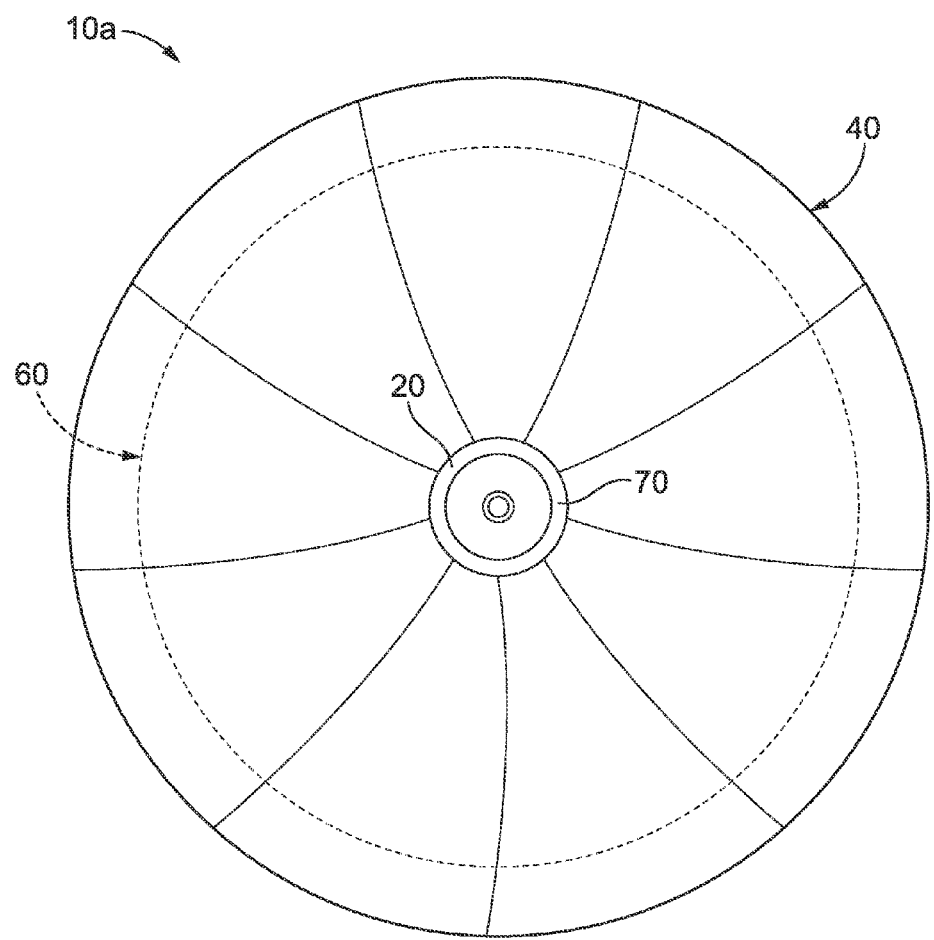
FIG. 6B shows a bottom view of the balloon 10a shown in FIG. 3B.

FIG. 6B shows a bottom view of the balloon 10a with balloon envelope 40 and pumpkin-shaped ballonet 60 shown in FIGS. 3B, 4B, and 5B. The envelope gores of balloon envelope 40 extend above balloon bottom 20 and are contiguous with the ballonet gores of ballonet 60 that extends above load ring 70.

With this design and manufacturing method the ballonet and envelope may be constructed at the same time from contiguous gores that comprise the ballonet gores and the envelope gores, which may be formed from a single piece of gore material. With this design and manufacturing method, although the initial manufacturing table needs to accommodate the additional length of the ballonet gores, the overall space required by the operation is reduced, because the ballonets do not need to be constructed in a separate area.

FIG. 7A illustrates the how the balloon 10 shown in FIGS. 3A, 4A, 5A, and 6A is constructed. As shown in FIG. 7A, once the sealing of the envelope gores and ballonet gores are completed, a load ring 70 is installed to the balloon envelope in a conventional fashion. At this point the balloon envelope 40 is constructed with envelope gores 28-33 that are contiguous with ballonet gores 51-56 of ballonet 50. In this regard, edge seam 32-33 between envelope gores 32 and 33 extends into edge seam 51-52 between ballonet gores 51 and 52; edge seam 31-32 between envelope gores 31 and 32 extends into edge seam 52-53 between ballonet gores 52 and 53, edge seam 30-31 between envelope gores 30 and 31 extends into edge seam 53-54 between ballonet gores 53 and 54, edge seam 29-30 between envelope gores 29 and 30 extends into edge seam 54-55 between ballonet gores 54 and 55, and edge seam 28-29 between envelope gores 28 and 29 extends into edge seam 55-56 between ballonet gores 55 and 56.

As shown in FIG. 7B, the ballonet 50 having gores 51-56 contiguous with gores 28-33 of balloon envelope 40 shown in FIG. 7A is inverted and pushed into the balloon envelope 40. In this manner, the ballonet 50 is attached to the balloon envelope 40 and positioned within the balloon envelope 40, as the ballonet gores 51-56 are contiguous with the envelope gores 28-33.

FIG. 8A illustrates the how the balloon 10a shown in FIGS. 3B, 4B, 5B, and 6B is constructed. As shown in FIG. 8A, once the sealing of the envelope gores and ballonet gores are completed, a load ring 70 is installed to the balloon envelope in a conventional fashion. At this point the balloon envelope 40 is constructed with envelope gores 28-33 that are contiguous with ballonet gores 61-66 of ballonet 60. In this regard, edge seam 32-33 between envelope gores 32 and 33 extends into edge seam 61-62 between ballonet gores 61 and 62; edge seam 31-32 between envelope gores 31 and 32 extends into edge seam 62-63 between ballonet gores 62 and 63, edge seam 30-31 between envelope gores 30 and 31 extends into edge seam 63-64 between ballonet gores 63 and 64, edge seam 29-30 between envelope gores 29 and 30 extends into edge seam 64-65 between ballonet gores 64 and 65, and edge seam 28-29 between envelope gores 28 and 29 extends into edge seam 65-66 between ballonet gores 65 and 66.

As shown in FIG. 8B, the ballonet 60 having gores 51-56 contiguous with gores 28-33 of balloon envelope 40 shown in FIG. 8A is inverted and pushed into the balloon envelope 40. In this manner, the ballonet 60 is attached to the balloon envelope 40 and positioned within the balloon envelope 40, as the ballonet gores 61-66 are contiguous with the envelope gores 28-33. The ballonets 50 and 60 shown in FIGS. 3A-8B, may advantageously be attached to the bottom of the inside of the balloon envelope 40 near the payload, which keeps the mass of the inflation system at the bottom of the envelope for in flight stability.

As an alternative method of forming the ballonet, as shown in FIGS. 9A and 9B, a large tubular ballonet 80 could be installed in the balloon envelope 40 of balloon 10b. The tubular ballonet 80 could be formed as a blown tube film 82, and could be advantageously formed of a lighter and/or thinner material than the balloon envelope. For example, the blown film 82 of ballonet 80 could have a thickness on the order of 0.8 mil, which is much thinner than the balloon envelope material which may have a thickness on the order of 2 mil. The large tubular ballonet 80 may also advantageously be attached to the bottom of the inside of the balloon envelope 40 near the payload, which keeps the mass of the inflation system at the bottom of the envelope for in flight stability. Forming the ballonet 80 as a blown tube would require no significant additional manufacturing time to be useful.

As shown in FIG. 9A, the ballonet 80 could be attached to balloon envelope 40 having envelope gores 28-33 and a load ring 70 positioned over the ballonet 80. As shown in FIG. 9B, the ballonet may be inverted through load ring 70 and positioned with balloon envelope 80.

4. Example Method of Forming a Balloon Envelope

Figure 10:
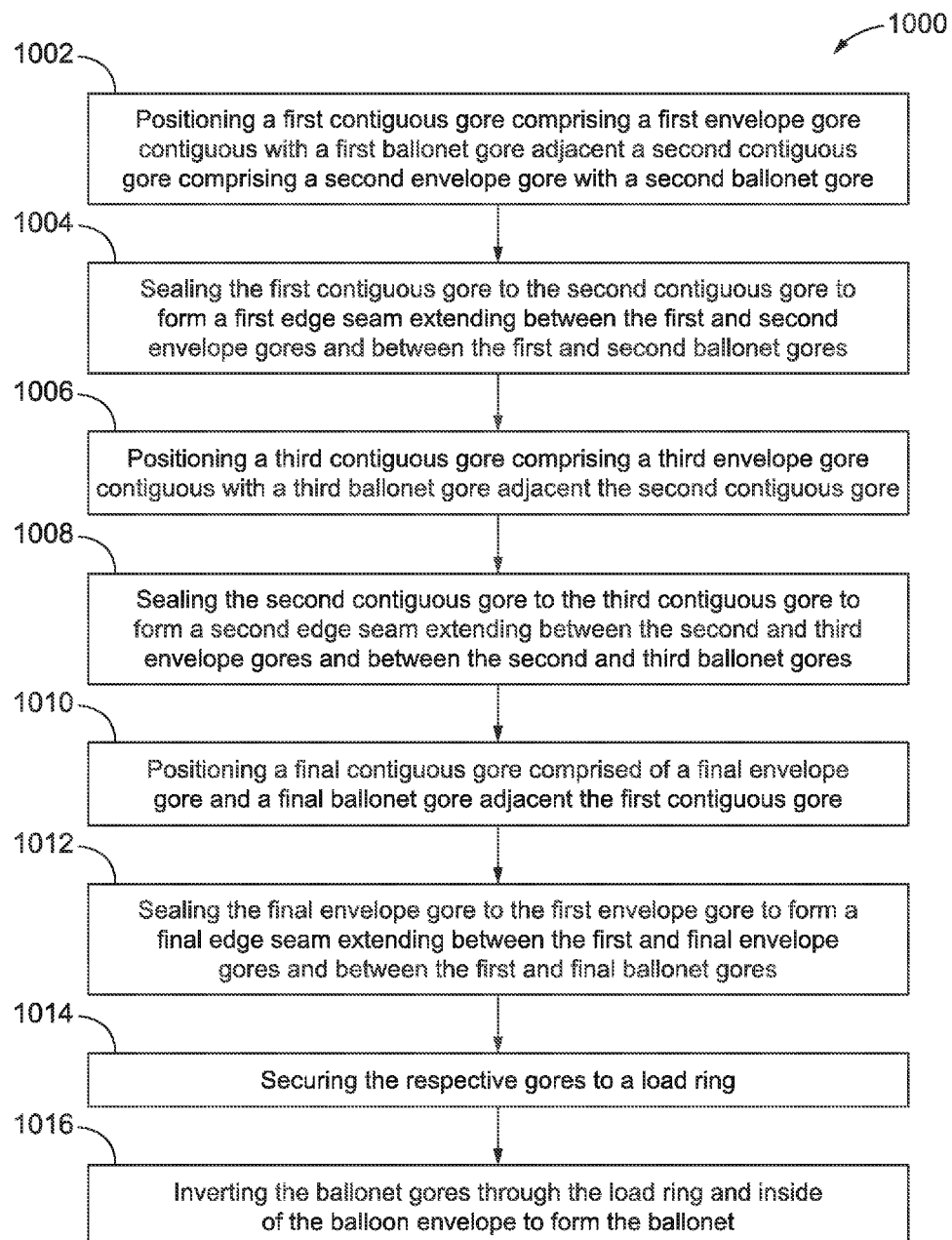
FIG. 10 is a method, according to an example embodiment.

FIG. 10 shows a method 1000 that may be used for forming a balloon envelope 10 shown in FIGS. 3-8B. Method 1000 is provided that includes the step 1002 of positioning a first contiguous gore comprising a first envelope gore contiguous with a first ballonet gore adjacent a second contiguous gore comprising a second envelope gore with a second ballonet gore, as well as step 1004 of sealing the first contiguous gore to the second contiguous gore to form a first edge seam extending between the first and second envelope gores and between the first and second ballonet gores, and step 1006 of positioning a third contiguous gore comprising a third envelope gore contiguous with a third ballonet gore adjacent the second contiguous gore;

Method 1000 further includes the step 1008 of sealing the second contiguous gore to the third contiguous gore to form a second edge seam extending between the second and third envelope gores and between the second and third ballonet gores, as well as the step 1010 of positioning a final contiguous gore comprised of a final envelope gore and a final ballonet gore adjacent the first contiguous gore;

Method 1000 also further includes the step 1012 of sealing the final envelope gore to the first envelope gore to form a final edge seam extending between the first and final envelope gores and between the first and final ballonet gores, the step 1014 of securing the respective gores to a load ring, and the step 1016 inverting the ballonet gores through the load ring and inside of the balloon envelope to form the ballonet.

The adjacent envelope gores may be placed on top of each other and an edge seam may be formed between adjacent envelope gores by heat sealing a common edge of the adjacent envelope gores that extends into a common edge between adjacent ballonet gores that are contiguous with the envelope gores. Furthermore, the steps of method 1000 do not need to be performed in the exact order listed. For example, a number of envelope gores could be attached together before attachment to another set of attached envelope gores. Similarly, a number of envelope gores could be lined up adjacent one another (rather than being stacked) and seamed together. Or sections of the balloon envelope could be formed and then the sections seamed together. For example, a first section having of nine envelope gores could be formed and sealed together with a second section having nine envelope gores.

5. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. An apparatus comprising:
    a balloon envelope formed with a plurality of adjacent envelope gores sealed together at respective edges of the envelope gores to form an envelope edge seam between each of the adjacent envelope gores;
    a ballonet positioned within the balloon envelope, the ballonet formed with a plurality of ballonet gores sealed together at respective edges of the ballonet gores to form a ballonet edge seam between each of the adjacent ballonet gores;
    wherein each envelope gore is contiguous with a ballonet gore such that each envelope edge seam between adjacent envelope gores extends into a ballonet edge seam.

2. The apparatus of claim 1, wherein each envelope gore contiguous with a ballonet gore is formed of a single, continuous piece of gore material.

3. The apparatus of claim 1, wherein each envelope gore is comprised of the same gore material as the contiguous ballonet gore.

4. The apparatus of claim 1, wherein the ballonet has a spherical shape.

5. The apparatus of claim 1, wherein the ballonet has a pumpkin shape.

6. The apparatus of claim 1, wherein the ballonet has a tubular shape.

7. The apparatus of claim 1, wherein the balloon envelope has a pumpkin shape.

8. The apparatus of claim 7, wherein longitudinal load tapes or tendons are positioned on the envelope gores.

9. The apparatus of claim 8, wherein at least some of the longitudinal load tapes or tendons extend onto the ballonet gores.

10. The apparatus of claim 9, wherein the ballonet has a pumpkin shape.

11. The apparatus of claim 1, further including a load ring attached to the balloon envelope wherein a top surface of the envelope gores form an exterior surface of the balloon envelope, and a top surface of the ballonet gores form an inside surface of the ballonet.

12. The apparatus of claim 1, wherein the ballonet gores extend over a load ring, and the ballonet gores are inverted into the balloon envelope to form the ballonet.

13. The apparatus of claim 1, wherein the ballonet gores are comprised of a gore material that is lighter or thinner than a gore material used for the envelope gores.

14. A method of forming a balloon envelope formed with a plurality of adjacent envelope gores sealed together at respective edges of the envelope gores to form an envelope edge seam between each of the adjacent envelope gores, a ballonet positioned within the balloon envelope, the ballonet formed with a plurality of ballonet gores sealed together at respective edges of the ballonet gores to form a ballonet edge seam between each of the adjacent ballonet gores, wherein each envelope gore is contiguous with a ballonet gore such that each envelope edge seam between adjacent envelope gores extends into a ballonet edge seam, comprising the steps of:
    positioning a first contiguous gore comprising a first envelope gore contiguous with a first ballonet gore adjacent a second contiguous gore comprising a second envelope gore with a second ballonet gore;
    sealing the first contiguous gore to the second contiguous gore to form a first edge seam extending between the first and second envelope gores and between the first and second ballonet gores;
    positioning a third contiguous gore comprising a third envelope gore contiguous with a third ballonet gore adjacent the second contiguous gore;
    sealing the second contiguous gore to the third contiguous gore to form a second edge seam extending between the second and third envelope gores and between the second and third ballonet gores;
    positioning a final contiguous gore comprised of a final envelope gore and a final ballonet gore adjacent the first contiguous gore;
    sealing the final envelope gore to the first envelope gore to form a final edge seam extending between the first and final envelope gores and between the first and final ballonet gores;
    securing the respective gores to a load ring; and
    inverting the ballonet gores through the load ring and inside of the balloon envelope to form the ballonet.

15. The method of claim 14, further including the steps of adhering a load tape or tendon to the first, second, third, and final contiguous gores wherein each of the load tapes extends continuously from the envelope gore onto the ballonet gore of the respective contiguous gores.

16. The method of claim 14, wherein each of the contiguous gores is formed of a single, continuous piece of gore material.

17. The method of claim 14, wherein the ballonet gores in each of the contiguous gores are comprised of a gore material that is lighter or thinner than a gore material used for the envelope gores in each of the contiguous gores.

* * * * *